Patented May 8, 1951

2,552,300

UNITED STATES PATENT OFFICE 2,552,300

CATALYTIC CONVERSION OF CYCLOHEXYL FORMATE TO CYCLOHEXANONE

Lyle A. Timm, Philadelphia, Pa., and John N. Cosby, Morris Township, Morris County, N. J., assignors to Allied Chemical & Dye Corporation, New York, N. Y., a corporation of New York No Drawing. Application September 20, 1947, Serial No. 775,381

10 Claims. (Cl. 260—586)

This invention relates to the production of cyclohexanone.

According to methods of the prior art cyclohexanone may be produced by dehydrogenation of cyclohexanol in the vapor phase in the presence of suitable dehydrogenation catalysts. In order to produce cyclohexanone from esters of cyclohexanol such as cyclohexyl formate, it has been necessary first to hydrolyze the esters to obtain cyclohexanol therefrom and then dehydrogenate the cyclohexanol to produce cyclohexanone.

We have discovered that cyclohexyl formate may be converted directly to cyclohexanone in high yield in the vapor phase in the presence of dehydrogenation catalysts.

An advantage of our invention is that cyclohexanone is produced from cyclohexyl formate in one step, whereas according to prior art methods two steps were required.

The general class of materials which are catalytically active for the dehydrogenation of organic compounds are active for the dehydrogenation of cyclohexyl formate in accordance with the process of our invention. The catalysts which are particularly suitable for conversion of cyclohexyl formate to cyclohexanone in the process of our invention are those which are active in the conversion of primary or secondary alcohols (such as cyclohexanol), to the corresponding carbonyl compound (cyclohexanone, in case cyclohexanol is the compound reacted). In one embodiment of our invention we employ dehydrogenation catalysts comprising zinc or mixtures or alloys of zinc and another metal such as copper, manganese, magnesium, iron, nickel, cobalt, which catalysts are known in the art. Our preferred catalysts comprise both zinc and copper, in the form of the metals or their oxides, or in part as the metals and in other part as the oxides. Prior to use for treatment of the cyclohexyl formate, catalysts prepared from the oxides are heated in hydrogen at temperatures resulting in at least partial reduction of oxide constituents. Accordingly, in stating the catalyst composition we do so with respect to the composition prior to such reduction or use in catalyzing the conversion of cyclohexyl formate to cyclohexanone. We especially prefer such catalysts comprising zinc and copper (in the form of the metal or the oxide) in weight ratio in the range 1:2 to 2:1, calculated as the metal. We prefer to prepare our zinc-copper dehydrogenation catalyst by the method hereinafter described but, as indicated above, our invention is not limited to a particular catalyst nor to a method of preparing such catalyst.

The conditions of temperature, space velocity, etc. to be maintained in our process will depend upon the catalyst employed, the activity of the catalyst (as influenced, for example, by the method of preparation), the concentration of cyclohexyl formate in the vapor phase mixture to be treated (if diluent vapors are present), the attack desired, and other factors familiar to those skilled in the art. Our preferred zinc-copper catalysts mentioned above are particularly active in converting cyclohexyl formate to cyclohexanone at temperatures in the range 380° to 430° C. Further, cyclohexanol may be readily dehydrogenated to cyclohexanone in the presence of these same catalysts at temperatures within this same range. Accordingly, if it is desired to convert a mixture of cyclohexyl formate and cyclohexanol to cyclohexanone, it is not necessary first to separate these compounds and then treat them, but the two compounds may be converted in the mixture. In a preferred embodiment of our invention, therefore, a mixture of cyclohexyl formate and cyclohexanol vapors is contacted with a zinc-copper dehydrogenation catalyst at a temperature at which both of the components of said mixture are converted to cyclohexanone. Similarly, the other dehydrogenation catalysts referred to above, which are active in converting cyclohexyl formate and cyclohexanol individually to cyclohexanone, may be used to catalyze the simultaneous conversion of both of these compounds in mixtures of the two.

In other embodiments of our invention mixtures of cyclohexyl formate with cyclohexanone or with cyclohexanol and cyclohexanone are contacted in the vapor phase with a dehydrogenation catalyst at a temperature at which cyclohexyl formate is converted to cyclohexanone. Mixtures containing approximately 5% by weight cyclohexyl formate (together with cyclohexanol and cyclohexanone) may be obtained by distillation of the crude reaction product from the liquid phase air oxidation of cyclohexane. Since, in many instances, cyclohexanone is the desired product of such cyclohexane oxidation reaction, the simultaneous conversion of cyclohexanol and cyclohexyl formate present in such mixtures to cyclohexanone by our method is a particularly advantageous embodiment of our invention.

Our preferred catalyst is prepared by mixing thoroughly 50 parts by weight of cupric oxide, 50 parts zinc oxide, 100 parts of a mixture of powdered metal (40% copper-60% zinc) which will pass through a 200 mesh screen and 3 parts graphite and then pelleting this mixture. The pellets are then heated in a current of air at 200°–300° C. Following this the pellets are reduced with hydrogen at 400° to 500° C. until substantially no additional water is removed. Catalysts active to produce cyclohexanone from cyclohexyl formate may also be prepared by this method, omitting the treatment with air at 200° to 300° C.

Our invention is illustrated by the following examples:

*Example 1.*—A stream of nitrogen gas was passed through a bed of the copper-zinc pelleted catalyst prepared as described above maintained at 394° C. in a refractory tube at a rate of 200 liters per liter of catalyst per hour. Cyclohexyl formate was evaporated into the stream of nitrogen at a rate of 6 gram mols per liter of catalyst per hour and passed over the catalyst. The product was condensed and the cyclohexanone was purified by fractionation. Cyclohexanone was obtained in 63% yield based on the mols of cyclohexyl formate charged.

*Example 2.*—A mixture obtained by distillation from the crude reaction product from the liquid phase air oxidation of cyclohexane, containing 5 mols percent cyclohexyl formate, 53 mol percent cyclohexanol and 42 mol percent cyclohexanone, was evaporated into a stream of nitrogen under the conditions described in Example 1. The product was condensed, and the cyclohexanone was purified by fractionation. Cyclohexanone was obtained in 87 mol percent yield, based on the cyclohexanol and cyclohexyl formate charged. By comparison with data from tests in which pure cyclohexanol was dehydrogenated to cyclohexanone under substantially the same conditions, it was calculated that the yield of cyclohexanone from cyclohexyl formate was 66 mol percent.

It is preferred to carry out our process under pressures of the vapors in contact with the catalyst in the neighborhood of atmospheric or somewhat above atmospheric, i. e. pressures of 0.3 to 5 atmospheres. However, the process may, if desired, be carried out under higher pressures.

We claim:

1. The process of producing cyclohexanone which comprises contacting cyclohexyl formate in the vapor phase with a catalyst comprising zinc at a temperature at which it is active to dehydrogenate the cyclohexyl formate to cyclohexanone.

2. The process of producing cyclohexanone which comprises contacting cyclohexyl formate in the vapor phase with a catalyst comprising a mixture of zinc and copper at a temperature at which it is active to dehydrogenate the cyclohexyl formate to cyclohexanone.

3. The process of producing cyclohexanone which comprises contacting a mixture comprising cyclohexyl formate and cyclohexanol in the vapor phase with a catalyst comprising zinc and a temperature at which cyclohexyl formate and cyclohexanol are dehydrogenated to cyclohexanone.

4. The process of producing cyclohexanone which comprises contacting a mixture comprising cyclohexyl formate and cyclohexanol in the vapor phase with a catalyst comprising a mixture of zinc and copper at a temperature at which cyclohexyl formate and cyclohexanol are dehydrogenated to cyclohexanone.

5. The process of producing cyclohexanone which comprises contacting a mixture comprising cyclohexyl formate, cyclohexanol and cyclohexanone in the vapor phase with a catalyst comprising a mixture of zinc and copper at a temperature at which cyclohexyl formate and cyclohexanol are dehydrogenated to cyclohexanone.

6. The process of producing cyclohexanone which comprises contacting cyclohexyl formate in the vapor phase with a dehydrogenation catalyst at a temperature at which it is active to dehydrogenate the cyclohexyl formate to cyclohexanone, said catalyst comprising a mixture of metallic zinc and its oxide and copper oxide which is subjected to reduction in hydrogen prior to contact therewith of said cyclohexyl formate.

7. The process of producing cyclohexanone which comprises dehydrogenating cyclohexyl formate in the vapor phase by contact with a dehydrogenation catalyst at a temperature in the range 380° to 430° C., said catalyst comprising a mixture of metallic zinc and its oxide and copper oxide in the weight ratio of total zinc to copper in the range 1:2 to 2:1, which mixture is subjected to reduction in hydrogen at a temperature in the range 400° to 500° C. prior to contact therewith of said cyclohexyl formate.

8. The process of producing cyclohexanone which comprises contacting a mixture comprising cyclohexyl formate and cyclohexanol in the vapor phase with a dehydrogenation catalyst at a temperature at which cyclohexyl formate and cyclohexanol are dehydrogenated to cyclohexanone, said catalyst comprising a mixture of metallic zinc and its oxide and copper oxide which is subjected to reduction in hydrogen prior to contact therewith of said mixture comprising cyclohexyl formate and cyclohexanol.

9. The process of producing cyclohexanone which comprises contacting a mixture comprising cyclohexyl formate and cyclohexanol in the vapor phase with a dehydrogenation catalyst at a temperature in the range 380° to 430° C., whereby cyclohexyl formate and cyclohexanol are dehydrogenated to cyclohexanone, said catalyst comprising a mixture of metallic zinc and its oxide and copper oxide in weight ratio of total zinc to copper in the range 1:2 to 2:1, which last mentioned mixture is subjected to reduction in hydrogen at a temperature in the range 400° to 500° C. prior to contact therewith of said first mentioned mixture.

10. The process of producing cyclohexanone which comprises contacting a mixture comprising cyclohexyl formate, cyclohexanol and cyclohexanone in the vapor phase with a dehydrogenation catalyst at a temperature in the range 380° to 430° C., whereby cyclohexyl formate and cyclohexanol are dehydrogenated to cyclohexanone, said catalyst comprising a mixture of metallic zinc and its oxide and copper oxide in weight ratio of total zinc to copper in the range 1:2 to 2:1, which last mentioned mixture is subjected to reduction in hydrogen at a temperature in the range 400° to 500° C. prior to contact therewith of said first mentioned mixture.

LYLE A. TIMM.
JOHN N. COSBY.

REFERENCES CITED

The following references are of record in the file of this patent:

UNITED STATES PATENTS

| Number | Name | Date |
|---|---|---|
| 1,926,632 | Roka | Sept. 12, 1933 |
| 1,961,912 | Querfurth | June 5, 1934 |
| 2,046,145 | Arnold | June 30, 1936 |
| 2,083,877 | Steck et al. | June 15, 1937 |
| 2,108,156 | Wortz | Feb. 15, 1938 |
| 2,338,445 | Laucht | Jan. 4, 1944 |